Oct. 27, 1942.  A. J. LIPPOLD  2,300,298
ARTICLE HANDLING MECHANISM
Original Filed Feb. 23, 1935
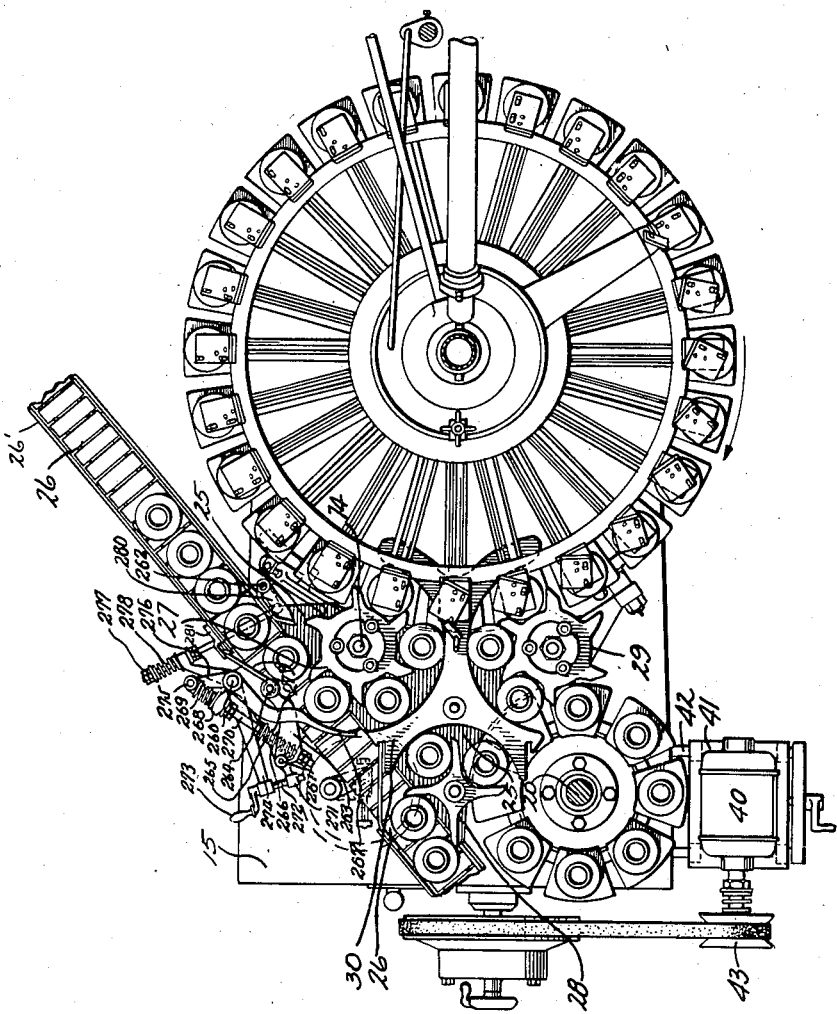
INVENTOR.
Adolph J. Lippold
BY Norman E. H. Weletzke
ATTORNEY.

Patented Oct. 27, 1942

2,300,298

UNITED STATES PATENT OFFICE 2,300,298

ARTICLE HANDLING MECHANISM

Adolph J. Lippold, Milwaukee, Wis., assignor to Cherry-Burrell Corporation, Chicago, Ill., a corporation of Delaware Application January 3, 1938, Serial No. 182,992, which is a division of application Serial No. 7,742, February 23, 1935. Divided and this application November 4, 1940, Serial No. 364,145

4 Claims. (Cl. 198—22)

This invention relates to improvements in article handling mechanisms. More particularly this invention relates to mechanism commonly referred to as an infeed gate or infeed throat for controlling the passage of bottles from a conveyor into a transfer mechanism of apparatus, such, for example, as bottle fillers. The invention is adapted for use with either intermittently or continuously moving conveyors and transfer mechanisms.

This application is a division of a co-pending application Serial No. 182,992, filed January 3, 1938, which was a division of application Serial No. 7,742, filed February 23, 1935, upon which latter application United States Patent No. 2,122,149 has been granted.

In bottle filling or similar mechanisms, particularly those of the rotary type in which the bottles are filled or otherwise treated while being carried on a rotary table or carrier, it is of prime importance to have the bottles accurately positioned in respective treating positions on the rotary table or carrier. In order to accomplish such positioning various mechanical transferring devices, such as intermittently or continuously rotatable or movable star wheels, etc., may be used. In each instance, however, it is also of prime importance that the bottles be immediately and accurately positioned in the bottle transferring device which transfers the bottles from a supply station to the treating station on the rotary carriers if the bottles are treated on such a device.

When the source of supply is a continuously moving conveyor, such as illustrated in the preferred embodiment of this invention set forth in the drawing, it is of importance to control the passage of bottles from the conveyor to and into the transfer mechanism to avoid misplacement and possible breakage of the bottles. It is also essential that the articles, after entering the transfer mechanism, be properly placed therein to facilitate the accurate positioning of the bottles on the rotary carrier in proper location for treatment.

Having in mind the above outlined desirable characteristics in a device of the type contemplated by this invention it is important to note that, in the present types of devices, breakage of bottles is common. Such breakage of the bottles usually occurs while they pass through the infeed gate or throat mechanism and engage the moving transfer mechanism.

The devices of the type contemplated by this invention which have preceded this invention do not appear to the applicant to possess the combined advantages of having the elements of the infeed gate or infeed throat which guides the bottles resiliently and individually mounted to prevent possible breakage of the bottles and the device, as well as having such elements simultaneously adjustable to accommodate the use of the devices for the handling of bottles of different sizes, and at the same time having the guide elements in the throat mechanism formed of a plurality of individually yieldable elements.

The prime objects of this invention are, therefore, to provide an improved article handling mechanism in which the articles are guided from the conveyor into the transfer mechanism and accurately positioned in such transfer mechanism by resiliently mounted, individually yieldable, pivoted and simultaneously adjustable linkages which accurately position the bottles in the transfer mechanism after guiding them into the desired transfer position whereby more satisfactory operation of the entire infeed and transfer mechanism is secured with less breakage of articles and elements of the apparatus.

Other important objects and features of this invention will become more apparent upon examination of the details of construction, as disclosed in the accompanying drawing, all of which will be first fully described and then specifically pointed out in the appended claims, reference being made from time to time to the drawing.

The accompanying figure is a plan view of the improved infeed gate or throat mechanism mounted on a rotary type bottle filling device.

Referring to the drawing, in which like numerals are used to identify like elements, 15 represents a base of a bottle filler and capper which is provided at one end with a rotary bottle filling mechanism and at the other end with a bottle capper assembly supported on a shaft 20. Spaced above the hollow base 15 and at the level of the lower bottle supports of the rotary carrier on which the bottles are filled and which is mounted upon the base, is a table 25 across which the bottles are loaded, unloaded and transferred between the filling and capping operations after being received from and before delivery to a conveying mechanism.

A single conveyor 26 is flush with the edge of the table and serves to supply empty bottles and remove filled bottles from the machine. The conveyor 26 operates tangently with reference to the loading star wheel 27 and the unloading star wheel 28. The transfer star wheel is shown at 29. A suitable bottle guide member 30 of the form clearly indicated in the drawing has surfaces concentric with the axis of each of the three star wheels to cooperate therewith in guiding the movement of bottles.

The passage of the bottles from the conveyor 26 into the interdental spaces or pockets of the loading star wheel 27 and the accurate positioning of the bottles in these pockets without breaking the bottles involves one of the advantageous operative characteristics of the present invention. In order to accomplish this a throat or infeed mechanism is provided to facilitate the proper movement of a bottle into a pocket of a star wheel and the proper positioning of the bottle in the pocket of the star wheel after the bottle has been moved thereinto.

In the absence of an appropriate infeed gate or throat mechanism the top of the star wheel tooth may occasionally engage the side of a bottle under substantially balanced conditions of pressure so that the bottle will be held to the guide rails defining the path of travel of the bottles without tending to move either forwardly or rearwardly thereon. Ultimately the bottle may either be crushed, or may cause breakage of the machine, or may snap from its position with such force as to break itself or other bottles which it may engage. An infeed mechanism or throat device of the preferred construction, as shown in the accompanying drawing, is used to provide for such contingencies and at the same time to provide a mechanism which is readily and easily adapted for utilization on the various sizes of bottles.

Fixed vertical pins are provided at 260, 261 and 262. The arm 263 is fulcrumed upon pin 261. The arm 263 is provided with spaced bottle engaging portions at 264 and 265 and an intervening depression between these two bottle engaging portions. The bottle engaging head 264 of the arm 263 stands out above a portion of the conveyor 26 in a position such as to force or urge toward the star wheel the bottles which are approaching on the conveyor 26. In the event that there is a gap between the end of the arm 263 and the side wall 26' of the conveyor 26, which side wall parallels the path of the conveyor 26, a slide bar 279 may be provided. The slide bar 279 is an extension or wall element pivoted to the head portion 264 of the arm 263 and in sliding connection with the fitting 281 which is located at the end of the side wall 26' of the conveyor 26.

As a bottle passes around the head 264 of the pivoted arm 263 the lateral motion given to it inwardly toward the star wheel 27 will be in a direction opposite to that of the adjacent portions of the star wheel 27, which portions are moving outwardly toward the head 264. The bottle will be thrust toward one of the star wheel pockets or interdental spaces in a path such that it will be difficult, if not impossible, for the bottle to be caught by the end of a tooth of the star wheel 27.

The arm 263 is yieldable under the thrust of the compression spring 266 about its pivot 261 and this yielding movement is such that it will not only relieve a bottle of pressure applied thereon during the motion of the bottle but will tend to assure the same and accurate engagement of a bottle in a pocket of the star wheel 27. As the star wheel rotates any bottle which may be caught on the head portion 264 of the arm 263 will be pushed from said head portion into the adjacent recess in the arm 263 and its slight advance will relieve the pressure momentarily and seat or position the bottle in the star wheel pocket in its proper position.

It is the function of the second projection 265 on the arm 263 to assure the retention of a bottle in a pocket when it is delivered by the star wheel against the guide arm 267 which terminates flush with the guide member 30 referred to previously. The guide arm 267 is likewise pivotally mounted, being carried on the fulcrum pin 260 and provided with a projecting finger at 268 engaged by a compression spring 269 which, like the compression spring 266, is mounted or carried on a rod 270.

Carried by the fixed pin 261 is a boss 271 in which is threaded a screw 272 turnable by a crank 273. Crank 273 is fixed in an adjusting lever 274 so that the rotation of the crank 273 will oscillate the adjusting lever about the fixed pin 260. This adjusting lever has an arm 275 carrying the spring guide rod 270 and another arm 276 which is mounted or carried on the rod 277 in engagement with the compression spring 278 by means of which its motion is yieldably transmitted to the throat member 280 mounted on fulcrum pin 262.

It will be apparent that, when it is desired to adjust the machine to handle small bottles and to adjust the feeding throat accordingly, the crank 273 may be turned in a direction to move the lever 274 counter-clockwise about the fulcrum pin 260, thereby swinging the arm 275 in a direction to push the spring guide rod 270 downwardly to the left, as viewed in the drawing. By increasing the compression on the spring 266 and correspondingly increasing the compression on the spring 269, this movement of the spring guide rod will result in shifting inwardly the free ends of the lever arm 263 and guide arm 267 while at the same time shifting inwardly the free end of the throat member 280 on the opposite side of the conveyor 26. A reverse movement of the screw will adjust the parts in an opposite direction.

The bottle filling and capping mechanism may preferably, as indicated in the drawing, be powered by a driving motor 40 mounted on a motor support slide 41 carried on the bracket 42 on the outside of the base 15. The power is transmitted from the motor 40 and the driving pulley 43. The conveyor 26 is supplied with power by a conventional type of power unit (not shown in the drawing).

In the parent applications previously referred to, a detailed explanation has been made of other mechanism disclosed in the instant drawing which is not described specifically in this application. In the preceding paragraphs the novel improvements in an infeed mechanism or infeed throat for use in connection with the satisfactory transfer of bottles and the like from a conveyor to a transferring device, such as a star wheel, have been described. In the mechanism which constitutes the subject matter of the present invention, an infeed gate or throat has been provided which will effect the proper guiding of bottles from a conveyor which may be continuously in motion into a transfer mechanism for transferring the bottles to a subsequent treating station.

The infeed mechanism also accurately positions the bottles in the transfer mechanism so as to enable the subsequent accurate positioning of the same bottles in treating stations to which they are subsequently moved. By the use of resiliently mounted, individually yieldable and pivoted linkages which comprise the elements of the instant invention, all of which are so connected as to be simultaneously adjustable, an infeed mechanism has been provided in which the resulting breakage of bottles or breakage of elements of the infeed mechanism is prevented, thereby securing a substantial improvement in the resultant operation of a device of such type.

In the accompanying drawing the preferred embodiment of the invention has been illustrated. Obviously various modifications of the invention may become apparent to those skilled in the art upon reviewing the invention herein disclosed. The invention, however, is not to be restricted except in so far as it is necessary in view of the prior art and the spirit of the appended claims.

The invention is hereby claimed as follows:

1. In a device of the character described, the combination with a uni-directional conveyor, of a work guiding throat for guiding containers into a rotary conveying element from said conveyor comprising a plurality of spring-biased, individually yieldable elements, said elements being so disposed with respect to the endless conveyor that containers carried thereby may pass through the throat formed by said elements and cause said individual elements to yield, means pivotally mounting each of said elements, and means for simultaneously adjusting the several elements in directions to enlarge or diminish the path traversed by the work past said elements.

2. In a device of the character described, the combination with a table, a star wheel conveyor positioned above said table, of uni-directional conveying means for delivering work to the path of said star wheel conveyor, means for guiding the work into said path comprising a pivotally mounted arm having laterally projecting protuberances for work engagement, said protuberances being spaced in succession in the direction of work advance for urging the work between the teeth of the star wheel as said work advances and for finally seating the work therein, and means for yieldably resisting the pivotal movement of the arm away from the star wheel.

3. A work guide comprising, in combination, an adjusting lever, a spring guide connected therewith and carrying a plurality of springs, and a plurality of work guiding elements provided individually with pivotal mountings and individually engaged with the respective springs of said guide, whereby said several elements may be simultaneously adjusted by manipulation of said lever and spring guide to enlarge or diminish the path traversed by the work in passing said guiding elements.

4. A device of the character described comprising, in combination, a table, a star wheel positioned above said table, a conveyor for delivering work to said table in the path of said star wheel, pivoted, spring-biased arms having movable ends and being arranged in succession for sequentially guiding work from said conveyor into the path of said star wheel, means for adjusting the spacing between the movable ends of said arms from said star wheel according to the work to be handled thereby, and means for adjusting the tension of the springs biasing said arms.

ADOLPH J. LIPPOLD.